Patented July 31, 1923.

1,463,206

UNITED STATES PATENT OFFICE.

HARRY D. GIBBS, OF PENNSGROVE, NEW JERSEY, ASSIGNOR TO E. I. DU PONT DE NEMOURS & COMPANY, OF WILMINGTON, DELAWARE, A CORPORATION OF DELAWARE.

CATALYST AND PROCESS OF MAKING SAME.

No Drawing. Application filed May 7, 1920. Serial No. 379,545.

*To all whom it may concern:*

Be it known that I, HARRY D. GIBBS, a citizen of the United States, and a resident of Pennsgrove, in the county of Salem and State of New Jersey, have invented a certain new and useful Catalyst and Process of Making Same, of which the following is a specification.

This invention relates to the production of a catalyst useful in promoting various oxidation reactions, and it consists essentially in incorporating infusorial earth or equivalent material in molten vanadic oxide, and cooling and reducing the resulting mass to a finely divided condition.

One object of my invention is to provide a catalyst consisting of vanadic oxide upon a carrier for the purpose of producing a catalyst composed of vanadic oxide having a higher fusing point than the pure material, and also being in a physical condition such that it is not friable and will retain the form and shape of the particles. Another object is to provide for the production of this catalyst in such a form that it can be readily used for the coating of various surfaces, for example, bricks, metal and other surfaces.

The usual methods of preparing vanadic oxide catalysts consist in employing solutions of ammonium vanadate or of vanadic oxide in various acid solvents and impregnating porous materials, for example, asbestos, pumice, etc., drying the asbestos and the pumice and igniting the same afterwards, by which process the asbestos and the pumice and other porous material is impregnated with vanadic oxide. In many operations the low fusing point of the vanadic oxide has been found to be a disadvantage, and it has been attempted to provide a vanadic oxide catalyst of a higher fusing point by mixing in certain quantities of iron or iron compounds, as provided by British Patent 5174 of 1913.

I have found that a very superior catalyst can be prepared by impregnating infusorial earth with vanadic oxide. Infusorial earth is composed largely of silica together with iron, alumina, calcium, magnesia and some alkalies, the silica existing chiefly as such and a portion forming polysilicates with the base. According to my invention this infusorial earth is put into molten vanadic oxide in a crucible, whereupon it absorbs a large proportion of vanadic oxide; the particles of the infusorial earth when separated by grinding or by allowing the particles to cool and solidify without touching each other, produce a catalyst that is not easily friable and has a high point of fusion. The subdivided mass may contain, for example, 1 part of infusorial earth to 3 parts of vanadic oxide. The resulting catalyst is, in many cases, more active than the ordinary powdered or fused vanadic oxide, and is for this reason applicable for use in more varied forms of apparatus and for the catalysis of a number of oxidation reactions.

I claim:

1. A process of producing a catalyst which comprises impregnating infusorial earth with molten vanadic oxide.

2. A process of producing a catalyst composed of particles of infusorial earth impregnated with vanadic oxide which comprises bringing infusorial earth into contact with vanadic oxide while the latter is in a molten condition, and then cooling and subdividing the resulting mass.

3. A catalyst comprising a mixture of one part of infusorial earth and about three parts of vanadic oxide.

4. A catalyst comprising infusorial earth impregnated with fused vanadic oxide.

5. A catalyst comprising a mixture of one part of infusorial earth and about three parts of fused vanadic oxide, said mixture being in a fine state of sub-division.

In testimony whereof I affix my signature.

HARRY D. GIBBS.